July 4, 1967 C. K. BILLEB 3,328,936

METHOD AND APPARATUS FOR WRAPPING DEFORMABLE ARTICLES

Filed Jan. 2, 1964 12 Sheets-Sheet 1

INVENTOR
CLYDE K. BILLEB

BY Thomas W. Ehrmann

ATTORNEY

INVENTOR
CLYDE K. BILLEB

BY Thomas W. Ehrmann

ATTORNEY

July 4, 1967 C. K. BILLEB 3,328,936

METHOD AND APPARATUS FOR WRAPPING DEFORMABLE ARTICLES

Filed Jan. 2, 1964 12 Sheets-Sheet 3

INVENTOR
CLYDE K. BILLEB

BY Thomas W. Ehrmann

ATTORNEY

INVENTOR
CLYDE K. BILLEB

BY
Thomas W. Ehrmann
ATTORNEY

INVENTOR
CLYDE K. BILLEB

BY
Thomas W. Ehrmann
ATTORNEY

July 4, 1967 C. K. BILLEB 3,328,936

METHOD AND APPARATUS FOR WRAPPING DEFORMABLE ARTICLES

Filed Jan. 2, 1964 12 Sheets-Sheet 6

INVENTOR
CLYDE K. BILLEB

BY

ATTORNEY

July 4, 1967 C. K. BILLEB 3,328,936

METHOD AND APPARATUS FOR WRAPPING DEFORMABLE ARTICLES

Filed Jan. 2, 1964 12 Sheets-Sheet 7

INVENTOR
CLYDE K. BILLEB

BY Thomas W. Ehrmann

ATTORNEY

METHOD AND APPARATUS FOR WRAPPING DEFORMABLE ARTICLES

Filed Jan. 2, 1964 12 Sheets-Sheet 8

INVENTOR
CLYDE K. BILLEB

BY Thomas W. Ehrmann
ATTORNEY

INVENTOR
CLYDE K. BILLEB

BY Thomas W. Ehemann

ATTORNEY

INVENTOR
CLYDE K. BILLEB

BY Thomas W. Sherman
ATTORNEY

July 4, 1967 C. K. BILLEB 3,328,936

METHOD AND APPARATUS FOR WRAPPING DEFORMABLE ARTICLES

Filed Jan. 2, 1964 12 Sheets-Sheet 11

INVENTOR
CLYDE K. BILLEB

BY Thomas W. Ehrmann

ATTORNEY

July 4, 1967 C. K. BILLEB 3,328,936

METHOD AND APPARATUS FOR WRAPPING DEFORMABLE ARTICLES

Filed Jan. 2, 1964 12 Sheets-Sheet 12

INVENTOR
CLYDE K. BILLEB

BY Thomas W. Ehrmann

ATTORNEY

United States Patent Office 3,328,936
Patented July 4, 1967

3,328,936

METHOD AND APPARATUS FOR WRAPPING DEFORMABLE ARTICLES

Clyde K. Billeb, Shorewood, Wis., assignor to Milprint, Inc., Milwaukee, Wis., a corporation of Delaware
Filed Jan. 2, 1964, Ser. No. 334,976
3 Claims. (Cl. 53—28)

This invention relates to the packaging of articles in heat sealed wrappers, and particularly to a method and apparatus for packaging discrete deformable articles in a heat sealed wrapper formed of flexible packaging material.

There are numerous articles which could be advantageously packaged in heat sealed wrappers formed of flexible packaging material to protect the articles from the adverse effects of moisture, heat or contamination. Examples of such articles are candy bars, which must be packaged to provide a long shelf life under widely varying conditions, and bars of soap, which must have some degree of protection against moisture. In both examples, tightly sealed wrappers formed by heat sealing flexible packaging material would provide the required protection at low unit cost and with little added bulk or weight. However, these same articles are deformable under the application of heat and pressure necessary in the heat sealing operation. This is particularly true in the case of chocolate or chocolate covered candy bars.

Heretofore, such deformable articles have been packaged in wrappers formed by joining together with adhesives two or more layers of wrapping materials. Such practice necessitated extensive overlapping areas of wrapping material to insure proper seals and to prevent spilling of the adhesive material onto the contents. Such wrappers were also generally formed complete except for one open side to accommodate the later insertion of the article and it was not uncommon for the articles to be inserted by hand into the partially completed wrappers.

It is an object of this invention to provide a method for wrapping deformable articles in a fully heat sealed wrapper of flexible packaging material without damaging the deformable article by the heat and pressure necessary for the heat sealing.

It is another object of this invention to provide a method for forming a completely heat sealed wrapper of flexible packaging material about a deformable article to have the wrapper loosely wrap the article and yet exhibit a rigid appearance.

It is a further object of this invention to provide an apparatus for carrying out the method of this invention automatically without the necessity of bodily handling the article or wrapper.

It is also an object of this invention to provide an apparatus for automatically and continuously forming individual completely wrapped deformable articles from a continuous web of flexible packaging material.

It is another object of this invention to provide a novel heat sealing apparatus to apply a transverse heat seal to a continuous, traveling web of flexible packaging material and which sealing apparatus travels with the web during the dwell time of the heat sealing.

The foregoing and other objects will appear in the description to follow. In the description reference is made to the accompanying drawings which form a part hereof and in which there is shown by way of illustration a specific embodiment in which this invention may be practiced. This embodiment will be described in sufficient detail to enable those skilled in the art to practice the invention but it is to be understood that other embodiments of the invention may be used and that changes may be made in the embodiment described without departing from the scope of the invention. Consequently, the following detailed description is not to be taken in a limiting sense; instead, the scope of the present invention is best defined by the appended claims.

Figure 1:
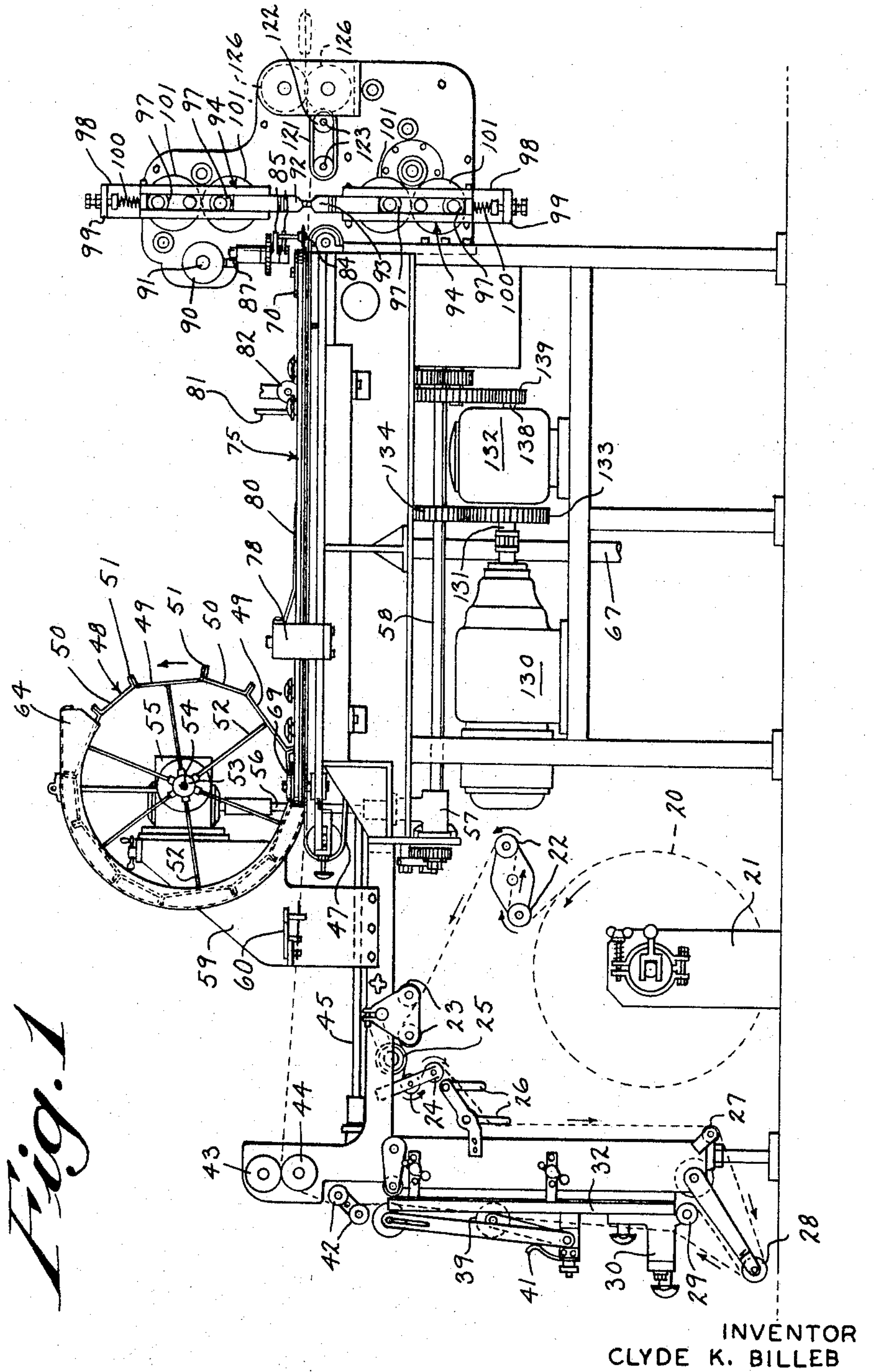
FIG. 1 is a side view in elevation of an apparatus in accordance with the present invention and having, in order, a folding stage, a feeding and longitudinal sealing stage, and a transverse sealing and cut-off stage.
Figure 6:
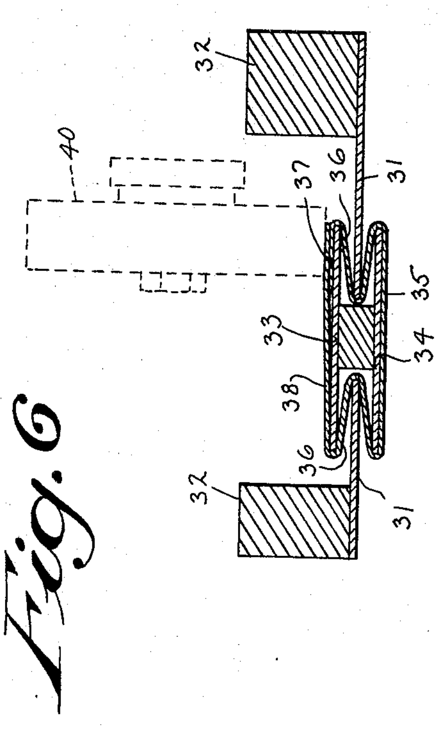
Figure 3A:
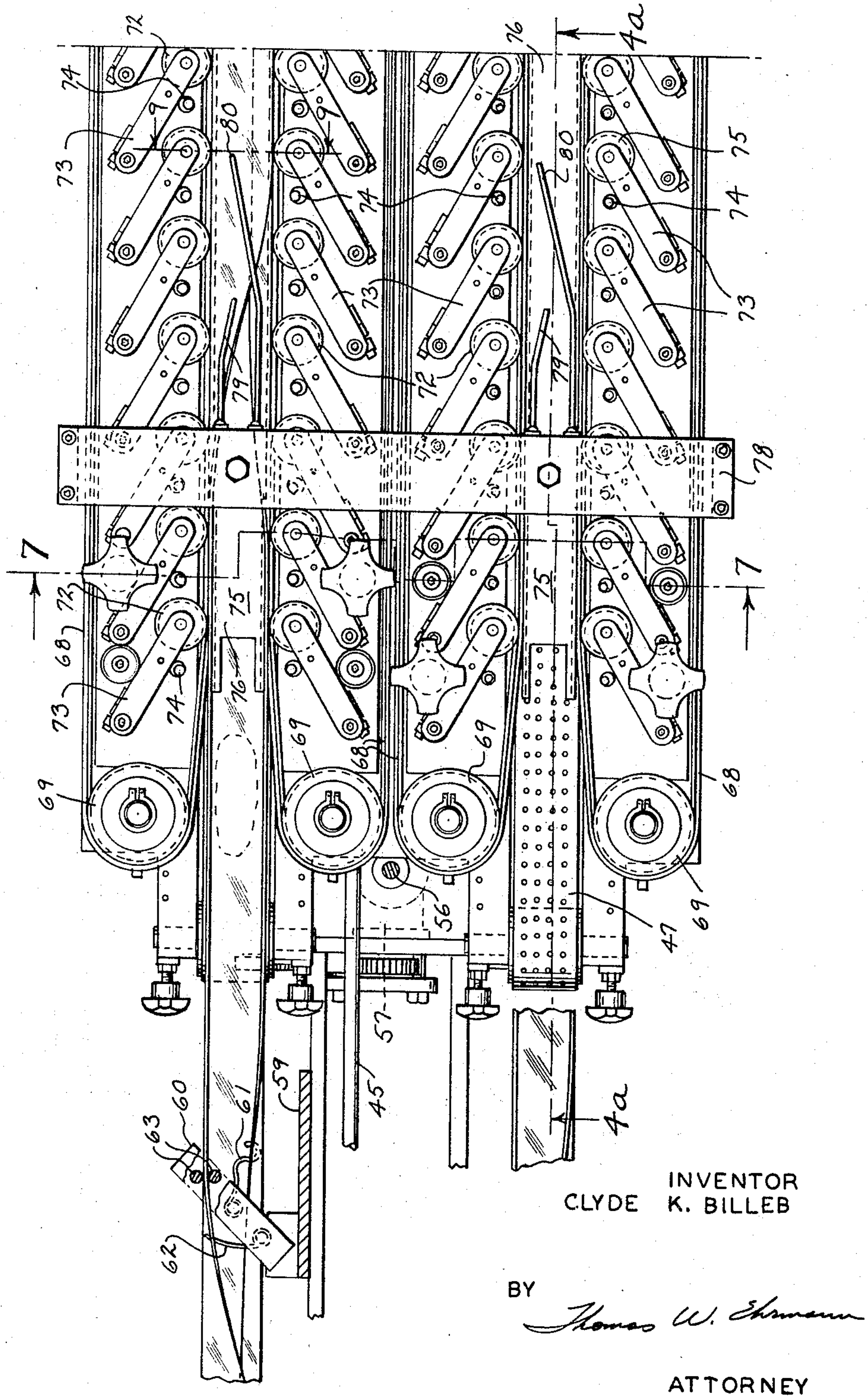
Figure 3B:
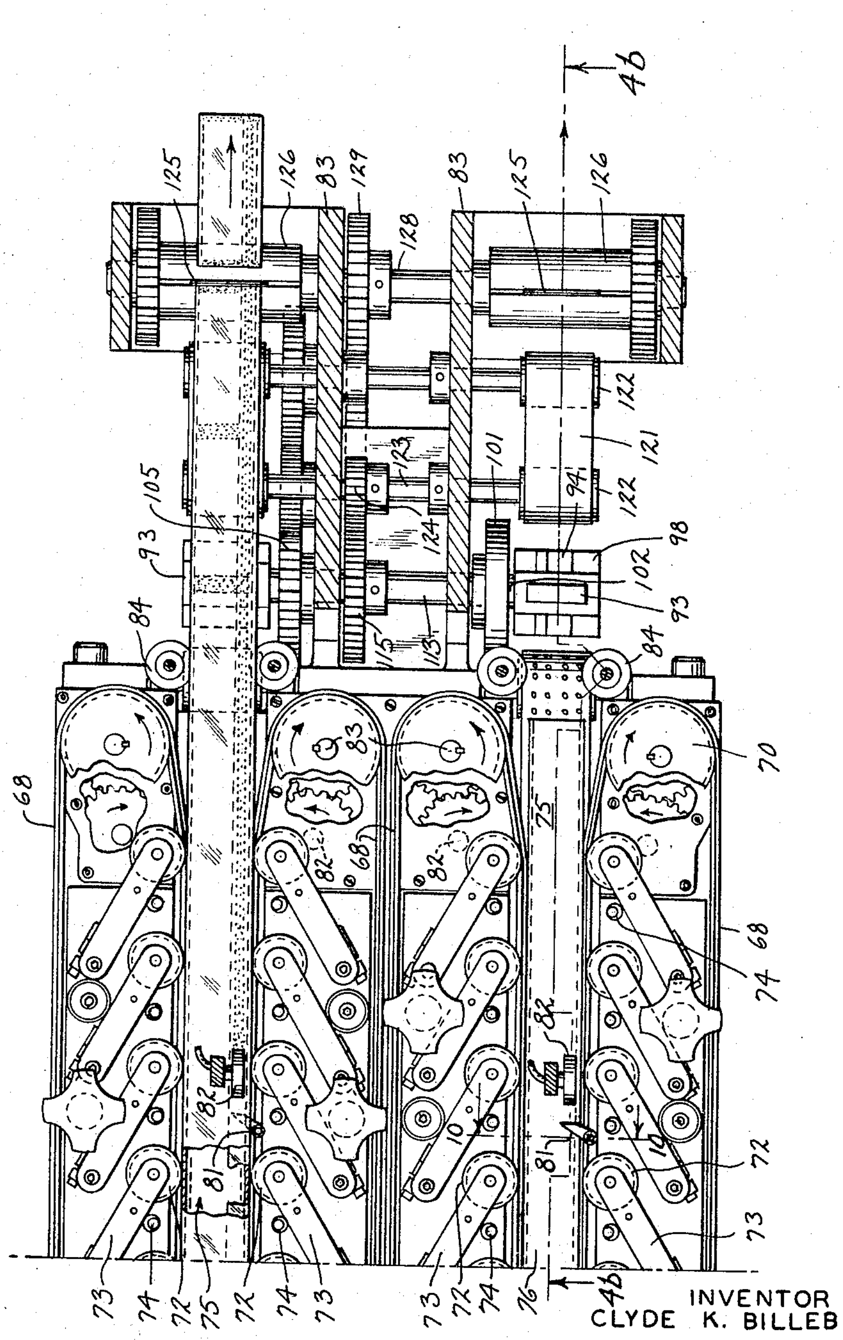
Figure 4A:
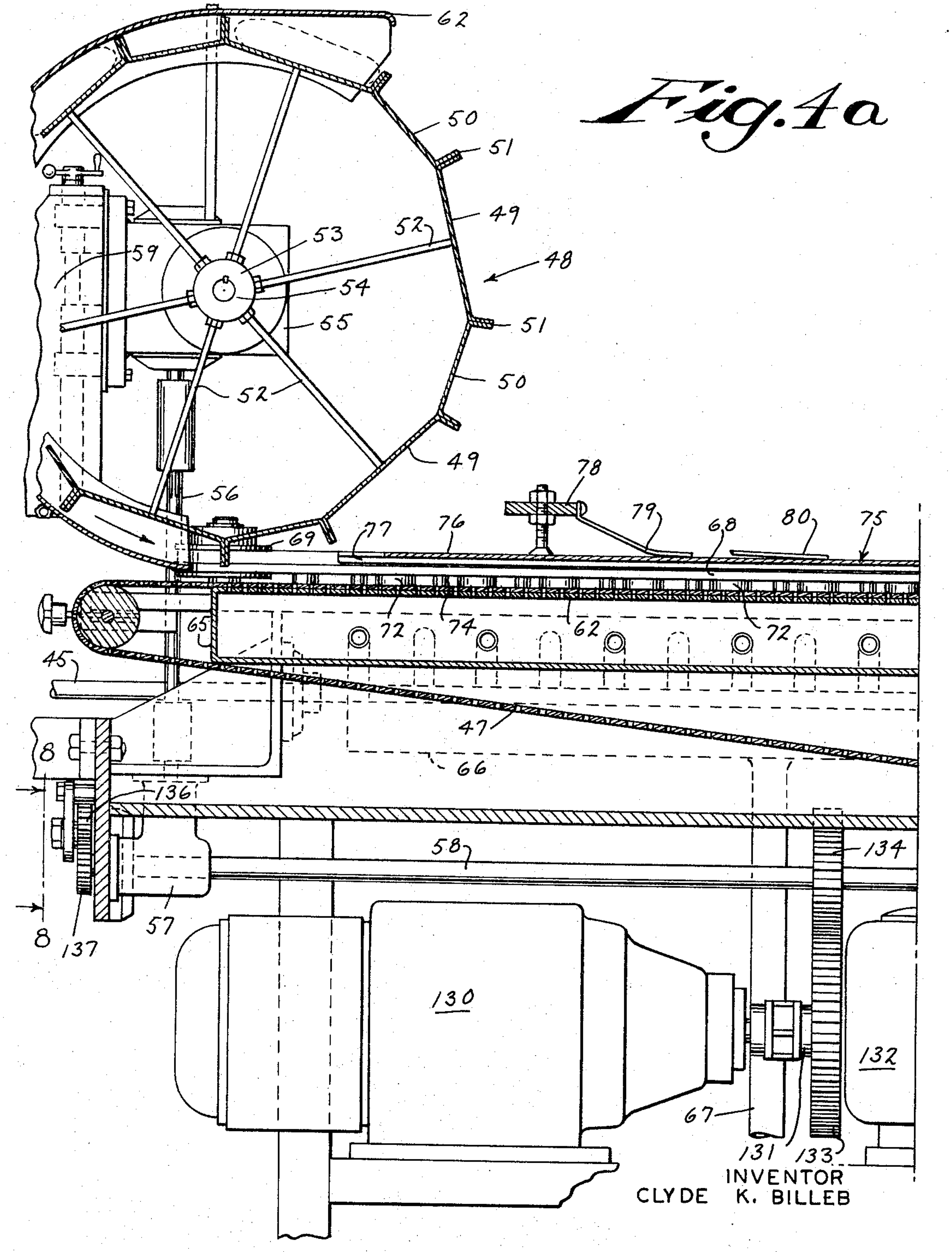
Figure 4B:
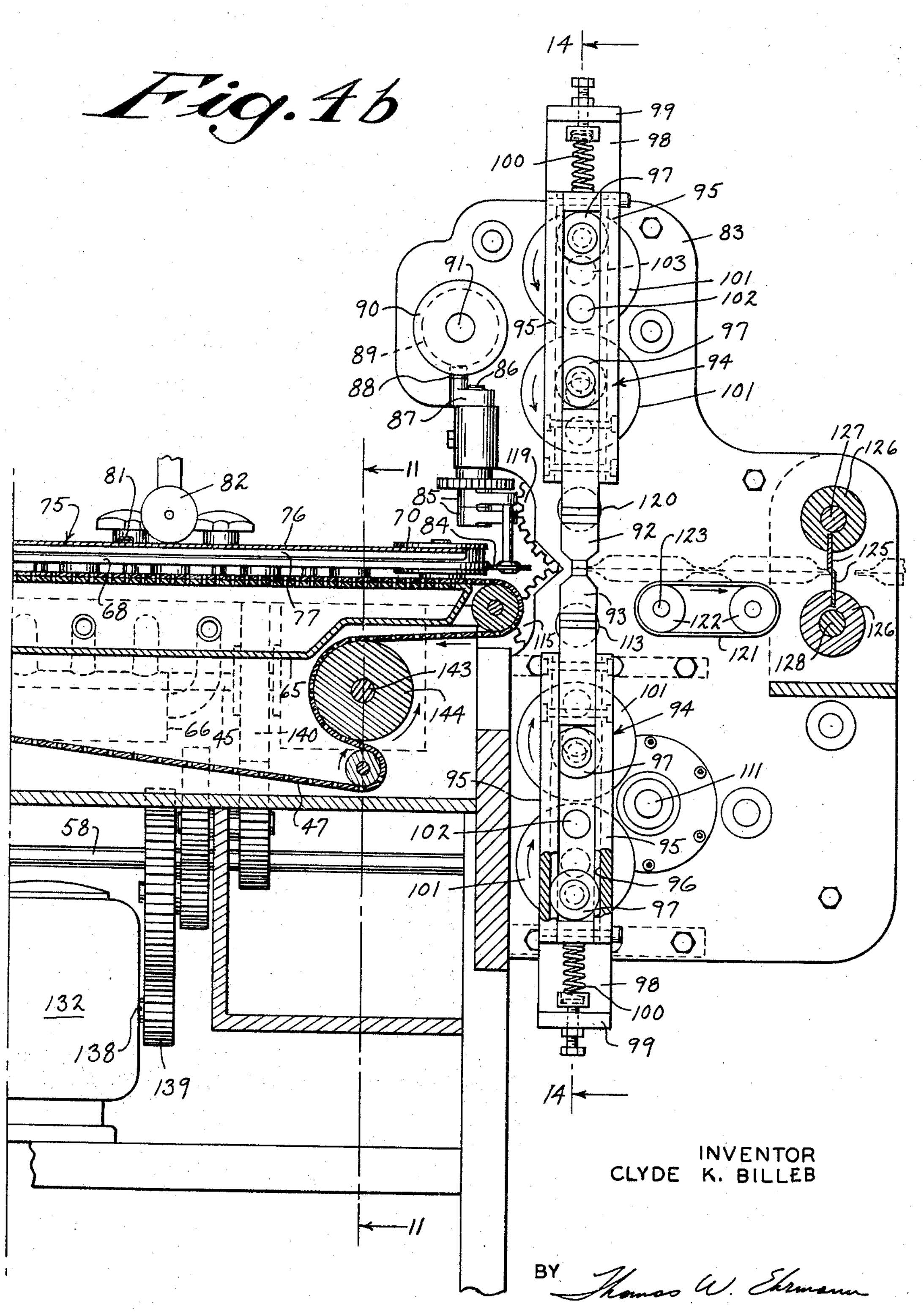
Figure 5:
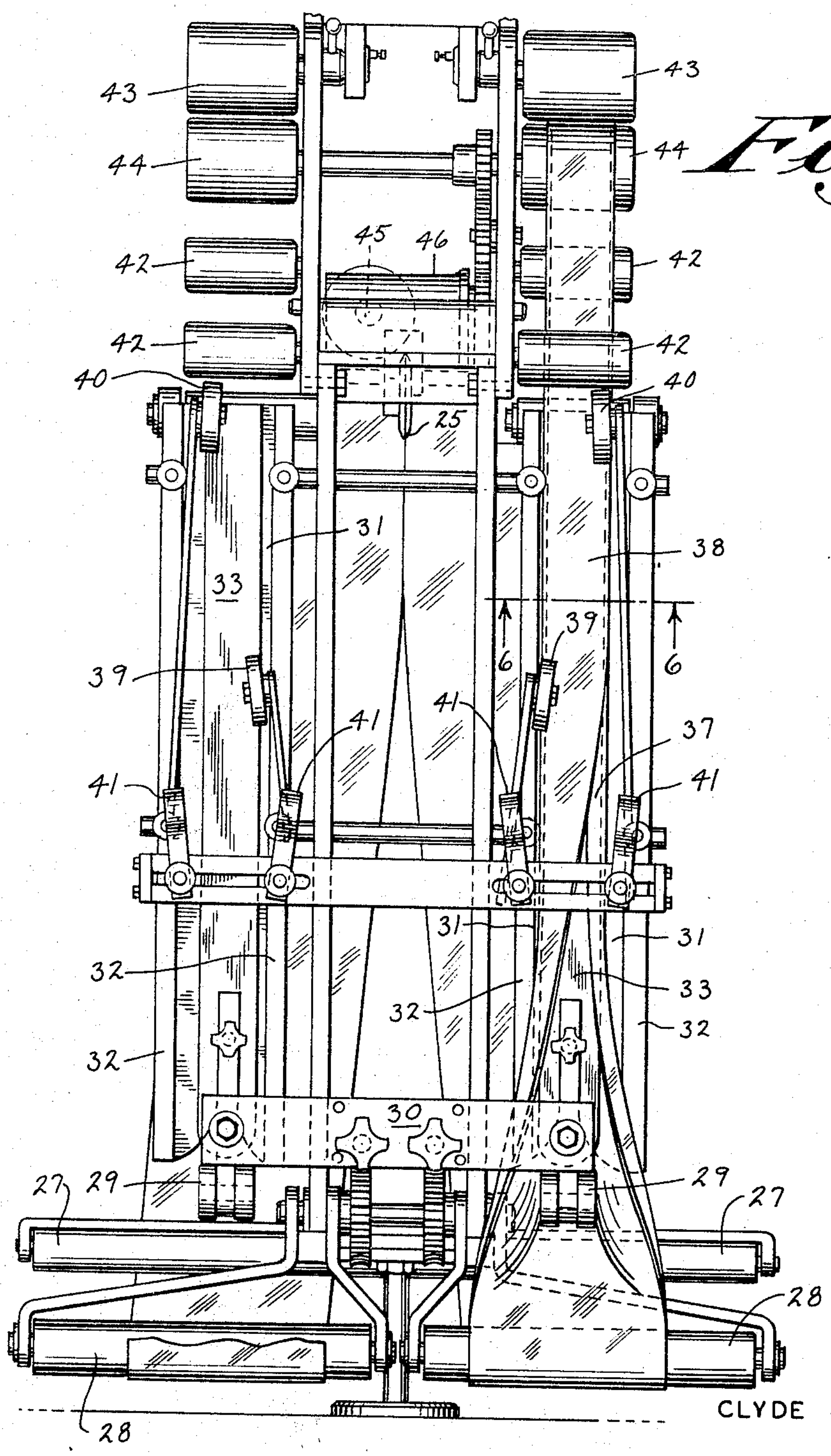
Figure 7:
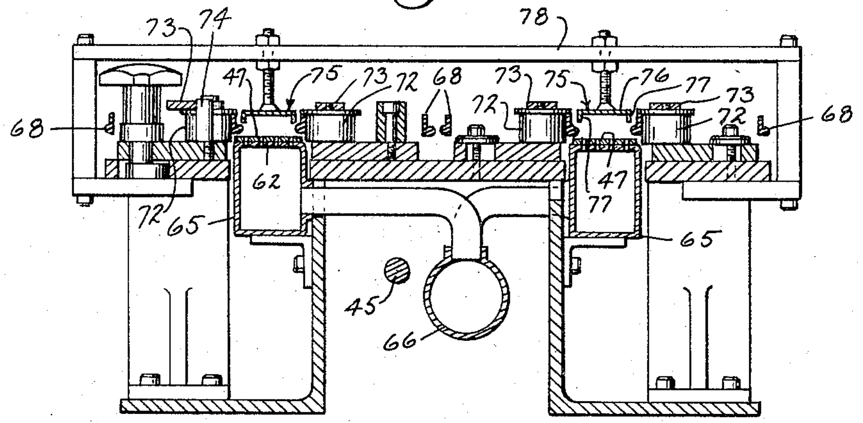
Figure 8:
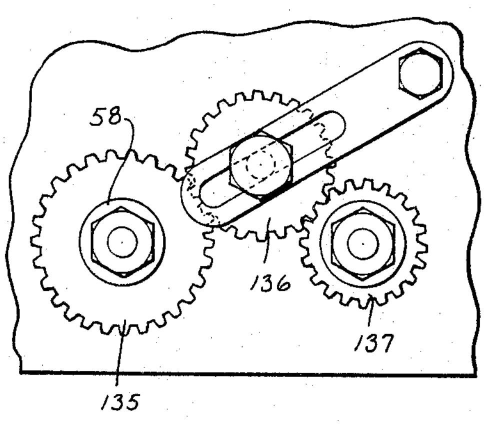
Figure 9:
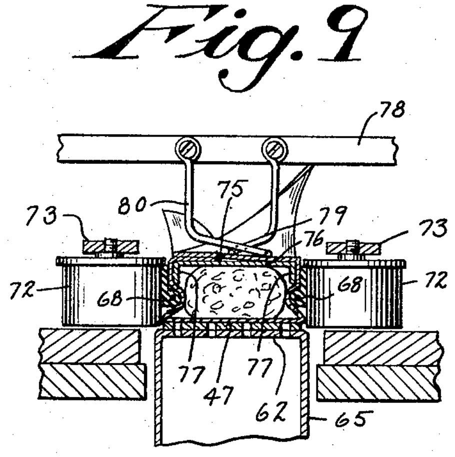
Figure 10:
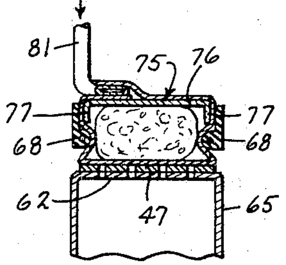
Figure 11:
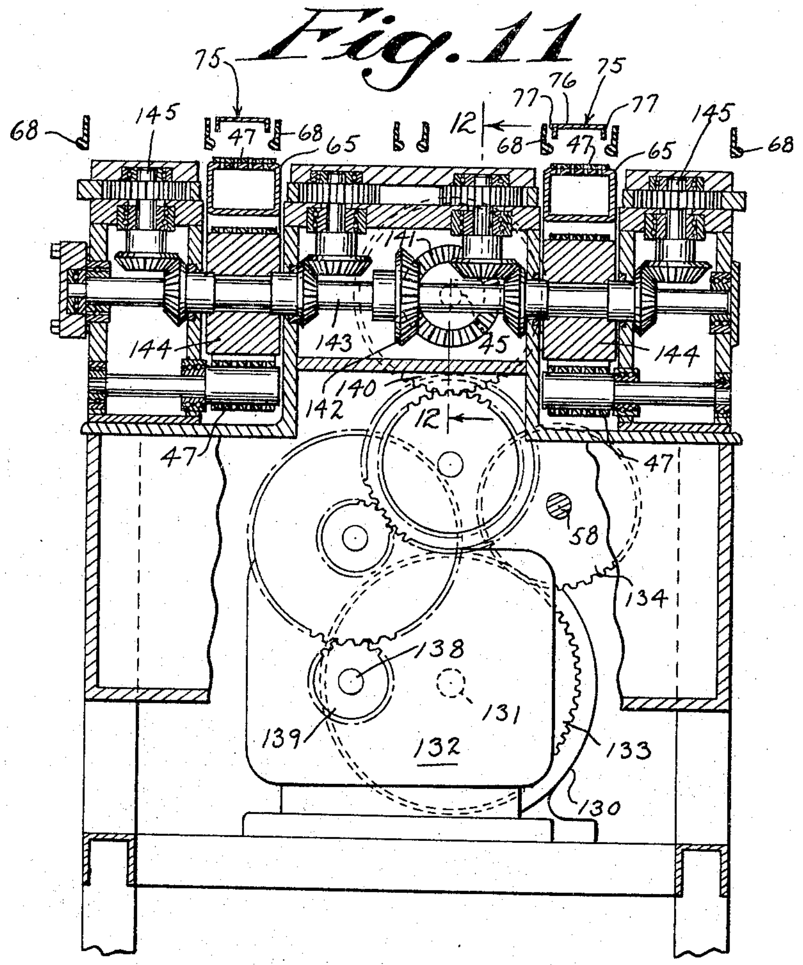
Figure 12:
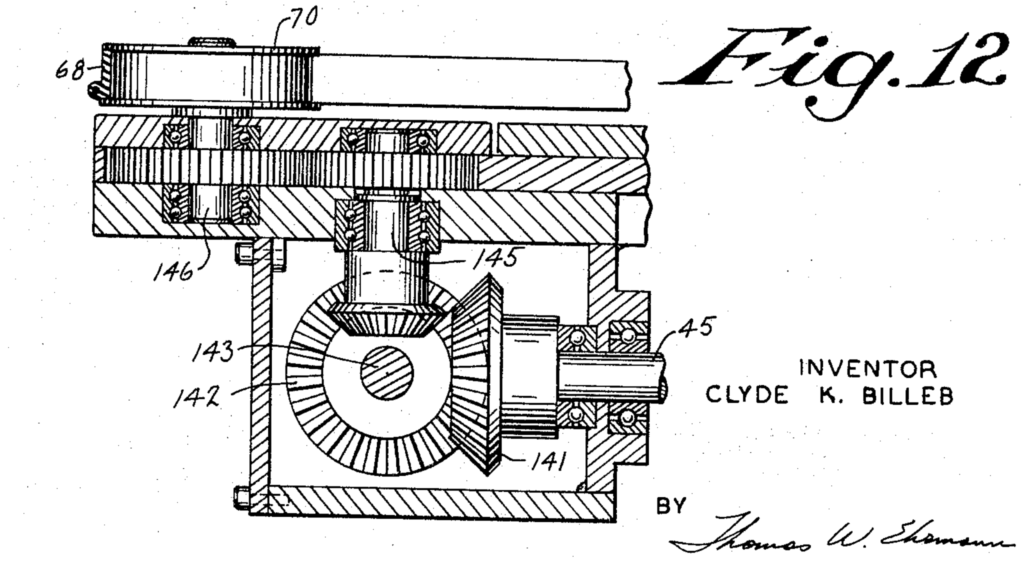
Figure 13:
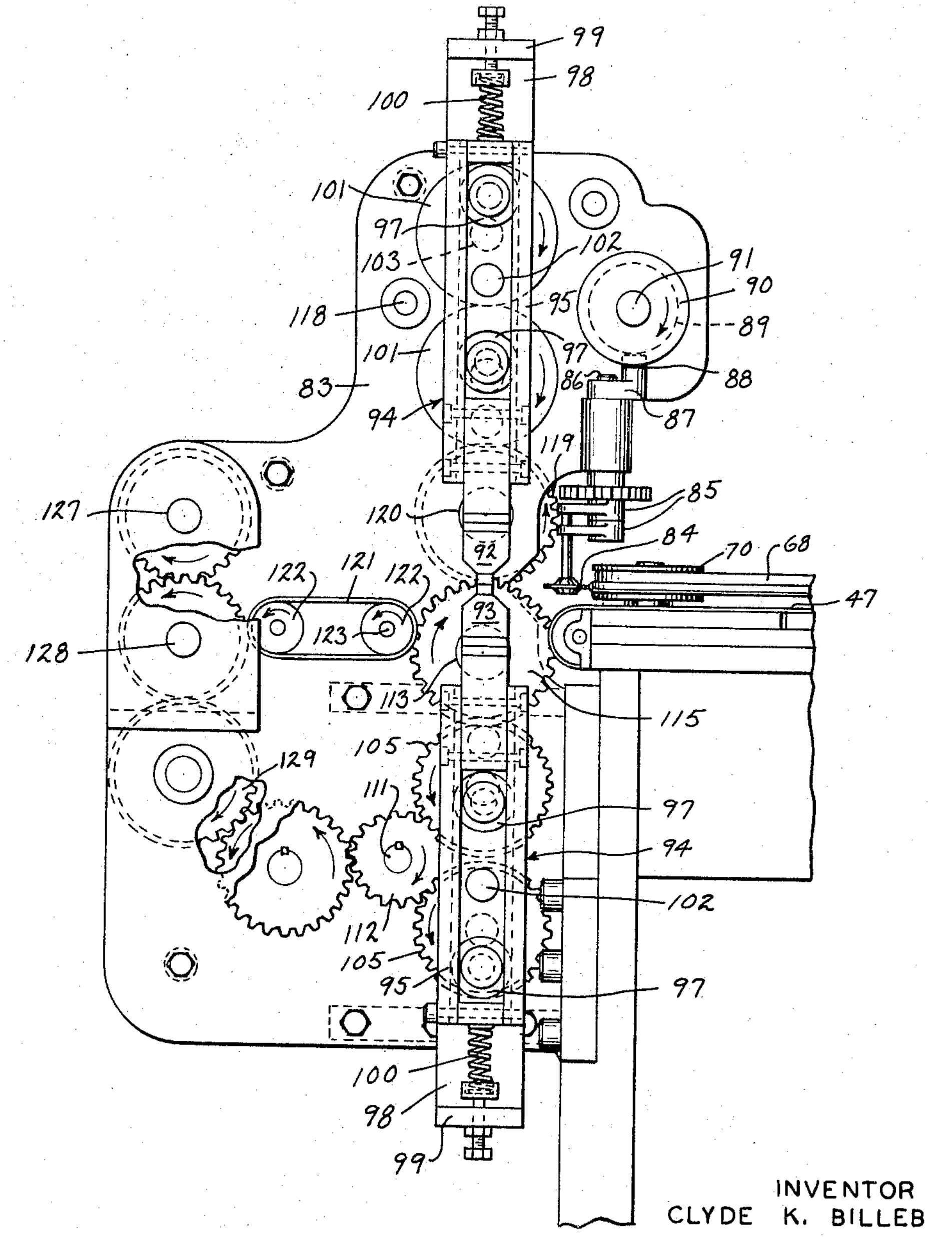
Figure 14:
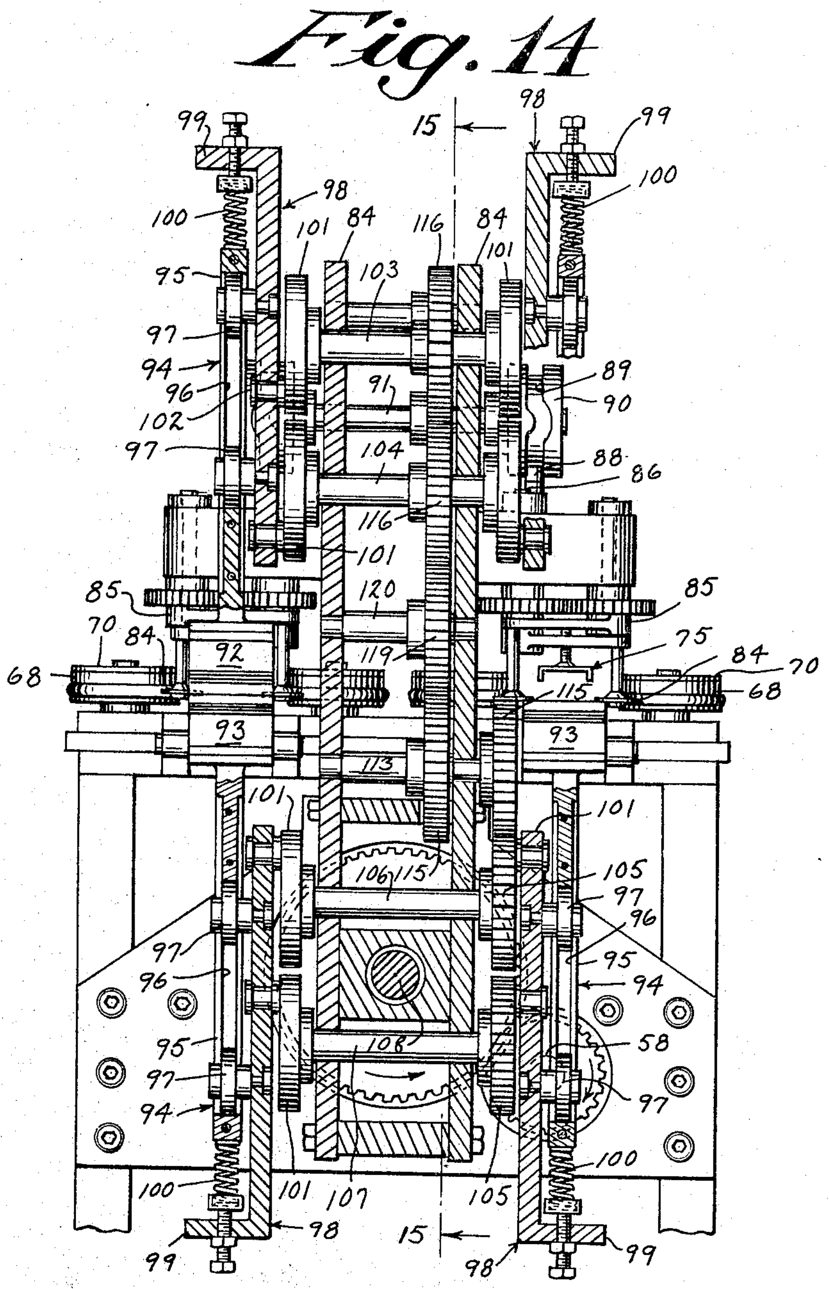
Figure 15:
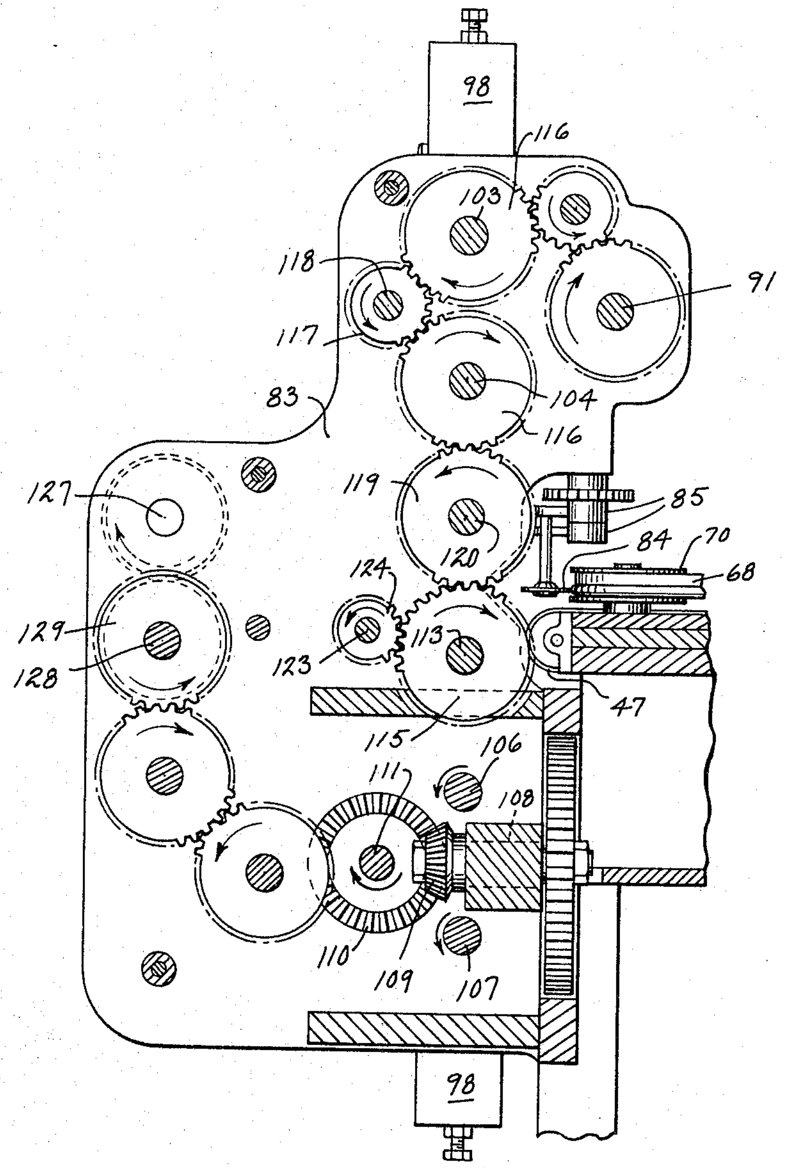

FIGS. 3*a* and 3*b* are enlarged top plan views of the feeding and longitudinal sealing stage and the transverse sealing and cut-off stage of the machine of FIG. 1, with FIG. 3*b* forming a right side continuation of FIG. 3*a*;

FIGS. 4*a* and 4*b* are views in vertical section taken in the plane of the lines **4*a*—4*a* and 4*b*—4*b*** of FIGS. 3*a* and 3*b*, respectively, with FIG. 4*b* forming a right side continuation of FIG. 4*a*;

FIG. 5 is a front view in elevation of the folding stage of the machine of FIG. 1;

FIG. 6 is a view in horizontal section taken in the plane of the line 6—6 of FIG. 5;

FIG. 7 is a view in vertical section taken in the plane of the line 7—7 of FIG. 3*a*;

FIG. 8 is a view in elevation viewed in the plane of the line 8—8 of FIG. 4*a*;

FIG. 9 is a view in vertical section taken in the plane of the line 9—9 of FIG. 3*a*;

FIG. 10 is a view in vertical section taken in the plane of the line 10—10 of FIG. 3*b*;

FIG. 11 is a view in vertical section taken in the plane of the line 11—11 of FIG. 4*b*;

FIG. 12 is a view in vertical section taken in the plane of the line 12—12 of FIG. 11;

FIG. 13 is a side view in elevation of the transverse sealing and cut-off stage of the apparatus of FIG. 1 viewed from the side opposite that shown in FIG. 4*b*;

FIG. 14 is a view in vertical section taken in the plane of the line 14—14 of FIG. 4*b*; and FIG. 15 is a view in vertical section taken in the plane of the line 15—15 of FIG. 14.

The method and apparatus of this invention have particular applicability for the production of wrappers packaging candy bars and of the type shown and described in the copending application of Clyde K. Billeb for Confectionery Wrapper, Ser. No. 285,802, filed June 5, 1963, now Patent No. 3,210,200 and assigned to the assignee of the present invention. Hereafter, specific descriptions of the method and apparatus of this invention will be directed to the packaging of candy bars.

Generally, the method of this invention includes folding a web of flexible wrapping material to form a wrapper having a front panel, a pair of gussetted side panels connected to the edges of the front panel, a back panel connected to the edge of one of the side panels, and a flap connected to the other side panel. The wrapping material is precreased to have the back panel and the flap oppose the front panel with the two gussetted side panels tucked between the back and front panels and with the flap beneath the back panel. The precreased wrapper is then opened by opening the back panel and the flap for the insertion of the candy bar into the opened wrapper to have the candy bar lie upon the inner surface of the front panel and between the side panels. The opened precreased wrapper with the candy bar in place is passed beneath a rigid member in the form of a tunnel, and the flap and back panel are refolded upon the upper surface of the tunnel. A longitudinal seam is then formed by heat sealing the flap and the overlapping back panel with the tunnel protecting the candy bar from both the heat and pressure. Next, transverse seams are formed by heat sealing the wrapper beyond the ends of the candy bar, and if the wrapper be formed from a continuous web of packaging material, the connected wrappers are severed at the transverse heat seals. The result is a totally sealed package of a rigid appearance which gently wraps the candy bar.

Figure 2:
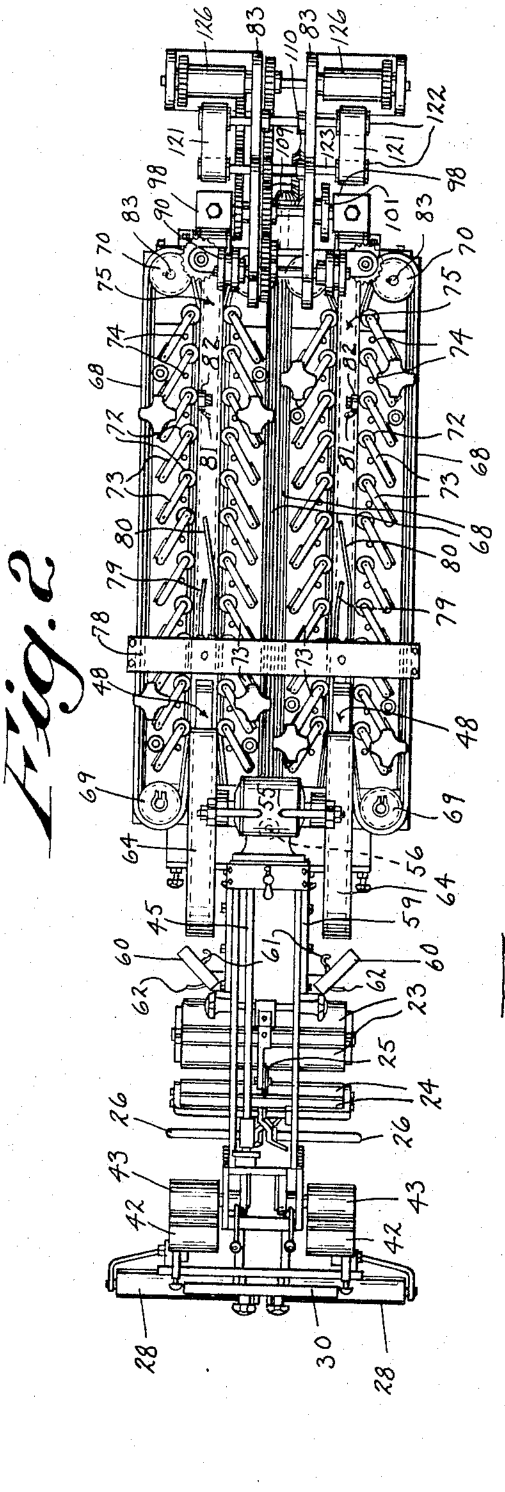
FIG. 2 is a top plan view of the apparatus of FIG. 1.

Referring now to the drawings, the apparatus of this invention, which automatically accomplishes the foregoing method, is shown in overall views in FIGS. 1 and 2. The apparatus includes three general stages. A first stage, or the forming stage, accepts a continuous web of flexible packaging material and precreases the material to the form above described. Since the embodiment to be described contains two candy bar wrapping lines in tandem, a single width of web material is employed as the stock and the web is slit prior to entering identical folding paths. A second stage, or the filling and longitudinal sealing stage, reopens the previously folded web material and deposits candy bars at spaced intervals within the length of the opened, prefolded wrapper. The wrapper with the candy bars in place travels beneath a tunnel and the wrapper is refolded and the longitudinal heat seal applied. In the third stage, the gussetted side panels are tucked in between each candy bar, a transverse heat seal is applied at spaced intervals, and the file of candy bars with the wrappers fully sealed is severed along the transverse heat seals to form individually wrapped candy bars.

Specifically, a roll 20 of the flexible web material is supported at its ends for rotation on standards 21. The web is threaded through a pair of tension rollers 22, a pair of positioning rollers 23, and yet another pair of rollers 24. Between the pairs of rollers 23 and 24, a circular knife blade 25 engages the web material to slit it along its longitudinal center line. The severed web is next moved to the twin paths of the folding section by pairs of inclined guide rods 26 which, as seen in FIGS. 1 and 5, move each half of the severed web laterally to the position of the respective folding line.

Each half of the web is then passed beneath a roller 27 and around an adjustable tension roller 28 before being admitted to the folding section. The two folding sections are mirror images of each other and the description of one will suffice for both. A central roller 29 provides the web with an initial formation to permit its acceptance into the folding stage. The central roller 29 is mounted on a main support 30 which extends transversely across the two folding lines. Referring to FIG. 5, a pair of side gusset forming plates 31 are each supported on longitudinal mounting members 32 and cooperate with a former assembly including a top forming plate 33 and a bottom forming plate 34 supported together by the transverse support 30. As can be seen in FIG. 6, the side gusset forming plates 31 and the top and bottom forming plates 33 and 34, respectively, fold the web material along longitudinal lines into a front panel 35, a pair of inwardly gussetted side panels 36, a flap 37 and a back panel 38.

The web material, after passing beneath the central roller 29, is threaded between the forming plates to receive the folds just described. One pressure roller 39 rides upon the formed back panel 38 at its edge to crease the edge and a second pressure roller 40 performs the same function along the folded edge of the flap 37. The pressure rollers 39 and 40 are spring biased towards engagement with the web material by leaf springs 41.

Upon leaving the forming plates 31, 33 and 34, each folded web is threaded through guide rollers 42 and between the bight of upper and lower drive rollers 43 and 44, respectively. The lower drive roller 44 is driven from a longitudinal drive shaft 45 and through a right angle drive unit 46 which mounts a gear connected by intermeshing gearing with the shaft of the lower drive roller 44. The upper drive roller 43 is pressed against the lower drive roller 44 so that the folded web is securely bit by the drive rollers 43 and 44. The drive rollers 43 and 44 draw the web material from the roll 20 past the circular knife blade 25 and through the folding stage. The rollers

43 and 44 also crease the folded web as it is drawn through the rollers 43 and 44.

The flexible packaging material which can be used in the method and apparatus of this invention may take numerous forms. Thermoplastic films having the ability to maintain a crease are suitable because of their inherent heat sealability. Other flexible packaging materials, such as glassines, papers, thermosetting films, and foils, can be rendered usable by the application of heat sealable coatings as is known in the art. Throughout the discussion which follows, it will be assumed that a glassine with a heat sealable coating applied to that surface which forms the inner surface of the wrapper is employed. The other surface of the glassine is uncoated except for a strip of coating upon the outer surface of the side panels 36 at the location of the transverse seals.

The precreased webs now journey to the filling and longitudinal heat sealing stage through which they are conveyed open endless conveyor belts 47. The machine includes two mirror image lines in the second stage and the description of one will suffice for both. At the entrance of the second stage, there are disposed a pair of candy bar feed wheels 48. Each feed wheel 48 is composed of a plurality of straight peripheral segments 49 spaced apart and joined by shorter segments 50. The segments 49 and 50 are turned up at their ends which are secured together to form lips 51. The segments 49 are supported by spokes 52 mounted on a hub 53. Each of the hubs 53 is mounted on the output shaft 54 of a right angle drive 55 driven by a vertical drive shaft 56 which is the output shaft of a second right angle drive 57. As will appear hereafter, the second right angle drive 57 is driven by a horizontal drive shaft 58. The right angle drive 55 is mounted on vertical standards 59 supported on the frame of the machine.

A web unfolding assembly is mounted upon each of the standards 59 to open the creased web and form the same into a tray for receiving the candy bars. Each unfolding assembly comprises a support plate 60 which extends laterally from the standard 59 and which mounts first and second unfolding wires 61 and 62, respectively. The first unfolding wire 61 rides beneath the flap 37 to open the same, and the second unfolding wire 62 rides beneath the back panel 38 to also open the same. The back panel 38 is guided into the second stage in an upright position by a pair of closely spaced depending rods 63 through which the back panel 38 and associated side panel 36 pass.

About a portion of the periphery of each feed wheel 48 there is disposed a shroud 64 which is open along its interior side but is otherwise closed to envelope the feed wheel 48. The shroud 64 extends somewhat beyond one-half of the circumference of the feed wheel 48 and terminates adjacent the conveyor belt 47. The shrouds 64 are free standing and cooperate with the unfolding assemblies to feed the web into the second stage with the back panel 38, the flap 39, and the side panels 36 generally upright.

Each conveyor belt 47 is perforated throughout its entire extent and in its uppermost plane of travel rests upon and moves over a suction box 65 which likewise has a perforated upper surface. The suction box 65 extends from a point beneath the feed wheel 48 to a point adjacent the end of the second stage. The suction boxes 65 for the two lines in the second stage connect through a plurality of tubes to a manifold 66 having a single pipe 67 connected thereto. The pipe 67 is connected to any suitable source for pulling a vacuum in the suction boxes 65 through the manifold 66.

Each of the second stage lines also includes a pair of endless flexible bands 68 disposed at the input end about idler pulleys 69 and at the output end about driving pulleys 70. The flexible bands 68 include a bead 71 upon their outer surfaces and which is disposed at a level above that of the conveyor belt 47 (see FIGS. 9 and 10). The inner plane of travel of each of the bands 68 is defined by the position of a plurality of guide pulleys 72 each mounted on an arm 73 which is spring biased toward the associated conveyor belt 47 and whose positions may be adjusted by eccentric members 74 which bear against the arms 73. The innermost plane of travel of each band 68 is parallel to the conveyor belt 47. The inner surface of the bands 68 may be provided with teeth which mesh with teeth on the pulleys 69 and 70 to insure positive, non-slip driving of the bands 68.

A tunnel member 75 formed of a rigid material is provided in each of the two lines. The tunnel members 75, which may be viewed in FIGS. 7, 9 and 10, each have a top side 76 spaced above the respective conveyor belt 47 a distance which exceeds the height of the candy bars and two lateral sides 77 which fit between the side panels 36 of the web. The tunnel members 75 begin at a point beyond the bottom of the feed wheels 48 and extend to a point near the ends of the conveyor belts 47. The tunnel members 75 are supported from a lateral support member 78 mounted on the frame of the machine, and are free of the belts 47 and bands 68.

The lateral support members 78 also mount short and long refolding fingers 79 and 80, respectively. As the opened web with the candy bar in place passes beneath the tunnel member 75, the short refolding finger 79 causes the flap 37 to be refolded down upon the upper surface of the top side 76 of the tunnel member 75 and the long refolding finger 80 causes the back panel 38 to be refolded over the flap 37 upon the top side 76 of the tunnel member 75.

As the now refolded wrapper continues to advance through the second stage, it encounters a spout 81 which is fed from any suitable source and is adapted to lay down a strip of heat sealable coating on the outer surface of the flap 37. In the embodiment being described, a hot melt is applied by the spout 81 between flap 37 and the back panel 38 and a pressure wheel 82 forces together the opposed surfaces of the flap 37 and back panel 38. In such manner, a longitudinal heat sealed seam is continuously formed along the length of the web. The rigid tunnel member protects the candy bars against the effects of the heat of the hot melt and the pressure exerted by the wheel 82.

The third stage includes a tucker assembly, a transverse heat sealer, and rotary knife means adapted to, in order, tuck in the gussetted side panels 36 of the web between successive candy bars, apply a transverse heat seal, and sever the completely sealed file of wrappers at approximately the center of the transverse heat seal. Again, there are two lines in the third stage. The third stage is supported generally on a pair of support plates 83.

Each tucker assembly includes a pair of tucker wheels 84 disposed on each side of the web as it passes therebetween. The tucker wheels 84 are each mounted on a crank arm 85 supported on separate shafts and connected by intermeshing gearing whereby the movement of one of the shafts supporting a crank arm 85 will cause movement of the other shaft in an opposite direction. A shaft 86 which supports the innermost one of the crank members 85 also mounts at its upper end a cam follower member 87 having an upwardly extending finger 88 which travels in a track 89 provided in a cam wheel 90. As seen in FIG. 14 the track 89 is laterally offset at one portion about its circumference. The two cam wheels 90, one for each tucker assembly, are mounted on a shaft 91 journaled in the support plates 83.

When the shaft 91 is rotated, the cam wheels 92 are rotated in a counterclockwise direction as viewed in FIG. 4*b*. When the fingers 88 encounter the offset portion of the track 89, the fingers 88 are moved outwardly of the machine to cause the shafts 86 to be rotated through a short arc in a clockwise direction as viewed from above. The small rotation of the shafts 86 cause the crank arms 85 supported thereon to move the associated tucker wheel 84 inwardly to engage one side panel 36 of the web. The intermeshing gearing will cause the opposite crank arm 85 also to move its associated tucker wheel 84 inwardly towards the other side panel 36. The result is that the tucker wheels 84 fold the gussetted side panls 86 inwardly to present the proper relationship for the application of the transverse seal which follows, and this occurs at timed intervals which correspond to the spacing of the candy bars.

Upper and lower heat seal elements 92 and 93, respectively, are each supported in a cage 94 which includes vertical side members 95 provided with central longitudinal grooves 96. The cages 94 are guided by and supported upon rollers 97 disposed between the side members 95 and which operate in the grooves 96. The rollers 97 are mounted upon stub shafts supported by a support member 98. The support members 98 include horizontal legs 99 which mount compression springs 100 biased between the undersides of the horizontal legs 99 and the tops of the cages 94. It will be seen from FIG. 14 that the rollers 97 are so spaced that the cages 94 may move vertically through a short distance independently of the support members 98.

The support members 98 are supported by wheels 101 by means of pins 102 which are mounted eccentrically on the wheels 101. The uppermost pair of wheels 101 are mounted on a shaft 103 journaled in the support plates 83 and the second pair of wheels 101 are mounted on a shaft 104 similarly journaled in the support plates 83.

The bottom heat seal element structure has wheels 101 only on one line of the machine. The opposite line of the machine has a pair of gears 105 mounted with the wheels 101 on upper and lower shafts 106 and 107, respectively, which are likewise journaled in the support plates 83. The gears 105 similarly mount pins 102 to support the associated support member 98.

The tucker assembly, the transverse heat sealer, and the cutter knife means are all driven from the horizontal drive shaft 58 (see FIG. 14). The drive shaft 58 drives an idler shaft 108 through meshing reduction gearing, and the idler shaft 108 mounts a bevel gear 109. The bevel gear 109 meshes with a second bevel gear 110 mounted on a shaft 111 journaled in the support plates 83. The shaft 111 mounts a gear 112 on an outboard end, and the gear 112 meshes with the gears 105 to drive the lower transverse heat sealer shafts 106 and 107. An idler shaft 113, also journaled in the support plates 83, mounts a gear 114 on an outboard end which is in meshing engagement with the upper one of the pair of gears 105 and also mounts a gear 115. The upper transverse heat sealer shafts 103 and 104 mount gears 116 which are driven in unison by an idler gear 117 mounted on an idler shaft 118, and the lower of the two gears 116 meshes with a gear 119 on yet another idler shaft 120. The gear 119 is in meshing engagement with the gear 115, and the upper transverse heat sealer shafts 103 and 104 are thereby driven from the shaft 113 through the meshing gears 116, 119, 116 and 117.

The directions of rotation of the various shafts are shown in FIGS. 13 and 15. It will be seen that the horizontal drive shaft 58 will cause the lower transverse sealer shafts 106 and 107 to be driven in a clockwise direction as viewed in FIG. 4*b* while, through the gear train heretofore described, the upper transverse sealer shafts 103 and 104 are caused to be driven in a counterclockwise direction as viewed in FIG. 4*b*.

As the lower transverse sealer shafts 106 and 107 are rotated in a clockwise direction and the upper transverse shafts are rotated in a counterclockwise direction, the associated wheels 101 and gears 105 are similarly rotated and the pins 102 describe circular paths to cause the support members 98 to rotate through circular paths and yet remain vertical. Thus, the support members 98 move toward and away from each other and during their swing toward each other travel in the same direction as the web. The cages 94 with attached upper and lower heat seal elements 92 and 93, respectively, close with the web before the support members 98 reach dead center and maintain contact for some time after the support members leave dead center to provide a dwell time. The provision of the dwell time results from the clearance in the mounting of the rollers 97 in the grooves 96 of the side members 97 of the cages 94. The compression springs 100 may be adjusted to provide the proper pressure between the heat seal elements 92 and 93 for the flexible packaging material used. The heat seal elements 92 and 93 are connected to a current source, as is known in the art.

The wrappers next encounter a short conveyor belt 121 supported on rollers 122, and a first roller 122 is mounted on a shaft 123 which carries a gear 124 meshing with the gear 115 of the shaft 113 and driven thereby. The short conveyor belt 121 may be perforated and cooperate with an additional suction box having a perforated upper surface, as with the conveyor belt 47.

The tucker assembly above described is driven by the power train for the transverse heat sealer shafts. That is, the shaft 91 which supports the cam wheels 90 is connected by meshing gearing to the upper transverse heat sealer shaft 103.

Finally, the file of sealed wrappers passes through a cutting stage in which the wrappers are severed at approximately the center of the transverse heat seal by a pair of rotating knife blades 125. The knife blades 125 are supported radially on hubs 126 mounted on shafts 127 and 128. The shafts 127 and 128 carry meshing gearing whereby the shafts are driven in opposite directions. The shaft 128 carries a gear 129 which is connected by meshing gearing to the shaft 111 whereby the hubs 126 are driven from the horizontal drive shaft 58.

The machine is powered by an electric motor 130 which has its output shaft coupled to the input shaft 131 of an adjustable variable speed drive 132. The input shaft 131 of the variable speed drive 132 also mounts a gear 133 which meshes with a gear 134 mounted upon the horizontal drive shaft 58. As previously described, one end of the drive shaft 58 forms the input to the gear train of the third stage and thus drives the tucker assembly, the transverse heat sealer shaft, the short conveyor belt 121, and the rotary knife blades 125. At its other end, the drive shaft mounts a gear 135 which meshes with an idler gear 136 also meshing with a gear 137 on the input shaft of the right angle drive 57 (see FIG. 8). Thus, the drive shaft 58 also drives the rotary feed wheel 48.

The output shaft 138 of the variable speed drive 132 mounts a pinion 139 which is connected by meshing reduction gearing to a gear 140 mounted upon the horizontal drive shaft 45. As previously indicated, one end of the horizontal drive shaft 45 forms the input to the right angle drive 46 for driving the drive rollers 43 and 44. The drive shaft 45 also provides the motive power for the bands 68 and the conveyor belts 47. As will be seen in FIG. 11, the drive shaft 45 mounts a bevel gear 141 at its other end and the bevel gear 141 meshes with a bevel gear 142 mounted on a transverse shaft 143. The transverse shaft 143 mounts drive rollers 144 for the conveyor belts 47 and also mounts a series of bevel gears meshing with additional bevel gears mounted on four stub shafts 145, one for each band 68. The stub shafts 144 each have a spur gear which meshes with a spur gear mounted on a shaft 146 supporting a respective drive pulley 70. Thus, the drive rollers 144 which move the conveyor belts 47 and the drive pulleys 70 which move the flexible bands 68 are all driven by the drive shaft 45. The intermeshing gearing is selected so as to have the conveyor belts 47 and the flexible bands 68 driven at the same speed.

It will be seen that one drive train is provided for those assemblies of the machine which perform the functions of feeding the candy bars into the opened webs, tucking in the gussetted side panels, applying the transverse heat seal, and severing the completely sealed files of wrappers. A second and separate drive train is provided for those assemblies which handle the web; namely, the prefolding and creasing stage and the conveying of the web through the second stage. The speed of the feed wheels 48 and of the third stage, both driven by the drive shaft 58, may be held at a 1:1 ratio with the motor speed. The speed of the web as it passes through the first and second stages may be properly adjusted to the speed of the feed wheels 48 and the third stage by suitable adjustment of the variable speed drive 132. If desired, an electric eye control may be employed to be responsive to indicia provided on the web to adjust the variable speed drive 132 when the web falls out of phase with the candy bar feeding and transverse heat sealing operations. Such controls are known in the art.

The general operation of the machine is as follows: The webs of flexible packaging material are drawn past the knife blade 25 and through the tandem folding lines by the driven rollers 43 and 44. The severed webs are folded in the manner previously described and the folds are creased by the driven rollers 43 and 44 so that a precreased continuous wrapper is formed. The precreased wrappers are then opened by the wires 61 and 62 which unfold the overlapping back panel 38 and flap 37. The rods 63 and the lateral sides of the shrouds 64 present the opened wrappers to the second stage in a condition in which the back panel 38 and flap 37 are disposed vertically and the gussetted side panels 36 are unfolded and generally vertical. Thus, a continuous, opened tray-like wrapper enters the second stage.

At the same time, candy bars are fed from a conveyor line or a hopper (not shown) to the top of the feed wheels 48 where they are deposited in each of the longer segments 49 of the feed wheels 48. As the feed wheels 48 are rotated in a counterclockwise direction as viewed in FIG. 1, the candy bars so deposited are carried downwardly by the feed wheels 48 and are prevented from falling away from the feed wheels by the shrouds 64. When the candy bars individually reach the bottom of the path of travel of the feed wheels 48 they encounter and are deposited within the opened wrappers. The candy bars rest upon the interior surface of the front panel 35 and between the side panels 36. The candy bars are deposited in the wrapper at predetermined spaced intervals.

The vacuum created by the suction boxes 65 and associated equipment will hold the front panels 35 securely upon the conveyor belts 47 for movement therewith and will also assist in holding the candy bars in place within the wrappers. The flexible bands 68 exert pressure upon the wrappers and candy bars and grip the gussetted side panels 36 and candy bars between the beads 71 to assist in moving the wrappers and candy bars together through the second stage and beneath the tunnel member 75.

The wrappers with candy bars in place move beneath the tunnel members 75 with the upstanding flaps 37 and back panels 38 extending above the top sides 76 of the tunnel members 75. The refolding fingers 79 and 80 then refold the flaps 37 and back panels 38 to overlap upon the top side 75 of the tunnel members 75. As the now refolded wrappers continue to advance, the spouts 81 deposit a hot melt between the flaps 37 and back panels 38 and the contacting surfaces are sealed by the pressure wheels 82 to form continuous longitudinal heat sealed seams.

The partially sealed wrappers leave the second stage and enter the third stage in which they first encounter the tucker assemblies. The tucker assemblies tuck in the gusseted side panels 36 between successive candy bars and are timed to cycle in unison with the feed wheels 48. The upper and lower heat seal elements 92 and 93 next engage the wrappers between successive candy bars and travel with the wrappers for a preselected period to apply by heat and pressure a transverse heat sealed seam. Lastly, the files of completely sealed wrappers are severed centrally of the transverse seams by the cycling rotating knife blades 125 to result in individual, fully wrapped candy bars. The wrappers have a rigid appearance although the candy bars are loosely wrapped.

When glassine which has a heat sealable coating on its inner surface only is employed, it is desirable to prepare the web of glassine by strip coating the outer surfaces of the side panels 36 with a heat sealable coating so that the transverse heat sealing will leave no loose edges.

The term "heat sealing" as used herein is meant to define the property of softening or fusing to form a satisfactory bond when subjected to momentary application of heat and pressure. The temperatures employed are above the softening temperature of the coating or film, the pressures generally vary between less than one pound to fifty pounds per square inch, and the dwell time is normally from a fraction of a second to several seconds.

Candy bars are merely exemplary of the deformable articles which are especially suited to be packaged in accordance with the method and apparatus of this invention. Articles which will melt, soften or run under the abnormal temperatures encountered in heat sealing, and articles which would crumble, be crushed, be distorted or marred under the pressures encountered in heat sealing would advantageously be packaged in accordance with the teachings of this invention. Articles which exhibit one or more of the above or related propensities are intended to be included within the term "deformable" as used herein.

I claim:

1. A method of wrapping deformable articles in a continuous web of flexible, heat sealable packaging material comprising the steps of: creasing the material along longitudinal lines to form a wrapper having a front panel, a pair of side panels, and overlapping back panel sections; unfolding the overlapping back panel sections to open the wrapper and form the same into a tray; placing said articles within said opened wrapper at spaced intervals along the length of said wrapper; drawing the opened wrapper with the articles in place beneath a rigid member; refolding the back panel sections to overlap upon said rigid member; heat sealing the overlapping back panel sections to form a longitudinal seam; withdrawing the partially sealed wrapper with commodities in place from said rigid member tucking said gusseted side panels inwardly of said wrapper beyond the ends of said article; transversely heat sealing the wrapper between successive articles to form transverse seams at spaced intervals along the length of the wrapper; and severing the wrapper at the transverse seams to produce individually wrapped deformable articles.

2. In an apparatus for wrapping deformable articles in a continuous web of flexible packaging material, the combination comprising: folding means for creasing said web along longitudinal fold lines to form a wrapper having a front panel, a pair of inwardly gusseted side panels, a flap that opposes said front panel and a back panel that opposes said front panel and overlaps said flap; means to draw said continuous web through said folding means to crease said web throughout its length; means for unfolding said overlapping back panel and flap to open said wrapper; article feeding means for depositing the articles within the opened wrapper at spaced intervals; a rigid tunnel member; conveying means supporting the opened wrapper and adapted to convey the opened wrapper beneath said article feeding means and to convey the wrapper with said articles in place beneath said tunnel member; refolding means adapted to refold said back panel and said flap in overlapping relation upon said tunnel member; longitudinal heat seal means adapted to heat seal said overlapping back panel and flap upon said tunnel member, said tunnel member forming a barrier between the heat and pressure of said longitudinal heat seal means and said deformable articles; tucker means disposed beyond said tunnel member and adapted to engage said side panels between successive spaced articles in said wrapper to tuck said gusseted side panels inwardly; transverse heat seal means adapted to heat seal said wrapper in the spaces between said articles; and means to sever said wrappers at said transverse heat seals to form individual, completely sealed wrappers for said articles.

3. The apparatus of claim 2 wherein said conveying means comprises a perforated driven continuous conveyor belt; together with a vacuum box having a perforated upper surface disposed beneath the upper run of said conveyor belt, means for creating a vacuum in said vacuum box, and a pair of driven continuous bands, one of said bands being disposed on each side of said conveyor belt at a level between said conveyor belt and the top of said tunnel member, said bands each having a bead that projects inwardly of the side of said tunnel member and grips side panels and said articles therebetween to cooperate with said conveyor belt to move said wrapper with said articles in place beneath said tunnel member.

References Cited

UNITED STATES PATENTS

| | | | |
|---|---|---|---|
| 2,462,254 | 2/1949 | Campbell | 53—182 X |
| 2,741,079 | 4/1956 | Rausing | 53—180 |
| 2,779,256 | 1/1957 | Keller et al. | 93—20 |
| 2,994,997 | 8/1961 | Gwinn et al. | 53—182 |
| 3,084,491 | 4/1963 | Solomon | 53—389 |
| 3,090,174 | 5/1963 | Kraft | 53—28 X |
| 3,237,364 | 3/1966 | Mack | 53—33 X |

FOREIGN PATENTS

| | | |
|---|---|---|
| 550,872 | 12/1957 | Canada. |
| 1,088,924 | 3/1955 | France. |
| 1,208,465 | 2/1960 | France. |

TRAVIS S. McGEHEE, *Primary Examiner.*

FRANK E. BAILEY, *Examiner.*

L. S. BOUCHARD, *Assistant Examiner.*